United States Patent
Sugimoto (10) Patent No.: US 9,567,929 B2
(45) Date of Patent: Feb. 14, 2017

(54) LIMP-HOME METHOD FOR SAFEGUARDING THE CATALYST OF AN INTERNAL COMBUSTION ENGINE IN CASE OF A DEFECTIVE CONTROLLED GRILLE SHUTTER AND VEHICLE THEREOF

(71) Applicant: Hitoki Sugimoto, Toyota (JP)

(72) Inventor: Hitoki Sugimoto, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/889,646

(22) PCT Filed: Apr. 17, 2014

(86) PCT No.: PCT/IB2014/000563
§ 371 (c)(1),
(2) Date: Nov. 6, 2015

(87) PCT Pub. No.: WO2014/181159
PCT Pub. Date: Nov. 13, 2014

(65) Prior Publication Data
US 2016/0108837 A1     Apr. 21, 2016

(30) Foreign Application Priority Data
May 9, 2013    (JP) ................. 2013-099054

(51) Int. Cl.
*F01N 3/00*    (2006.01)
*F02D 41/02*   (2006.01)
(Continued)

(52) U.S. Cl.
CPC ......... *F02D 41/0235* (2013.01); *B60K 11/085* (2013.01); *F01N 3/206* (2013.01);
(Continued)

(58) Field of Classification Search
CPC .............. F02D 41/0135; F02D 41/3005; F02D 41/0235; F02D 41/221; F02D 41/40; F01N 3/206; F01N 9/005; F01N 9/00; F01P 3/18; F01P 7/14; F01P 11/16; F01P 7/12; F01P 7/10; F01P 11/14; B60K 11/085; G01M 15/048; Y02T 10/6239
(Continued)

(56) References Cited

U.S. PATENT DOCUMENTS 5,553,451 A      9/1996  Harada
2003/0101947 A1  6/2003  Ries-Mueller
(Continued)

FOREIGN PATENT DOCUMENTS

EP   1531263 A2   5/2005
EP   2461006 A1   6/2012
(Continued)

*Primary Examiner* — Thomas Denion
*Assistant Examiner* — Kelsey Stanek
(74) *Attorney, Agent, or Firm* — Andrews Kurth Kenyon LLP (57) ABSTRACT

A vehicle is disclosed which includes: an engine; a catalyst purifying exhaust gas of the engine; a grille shutter adjusting an opening area of a radiator grille; and an electronic control unit configured to: (a) control an injection quantity of fuel to be supplied to the engine, (b) detect a malfunction of the grille shutter in a state where the grille shutter is closed, and (c) increase the injection quantity when the malfunction is detected in comparison to when the malfunction is not detected.

5 Claims, 3 Drawing Sheets

(51) Int. Cl.

| | |
|---|---|
| *B60K 11/08* | (2006.01) |
| *F02D 41/22* | (2006.01) |
| *F01P 7/10* | (2006.01) |
| *F02D 41/40* | (2006.01) |
| *F01P 11/14* | (2006.01) |
| *F01N 9/00* | (2006.01) |
| *F01N 3/20* | (2006.01) |
| *F01P 3/18* | (2006.01) |
| *F01P 7/14* | (2006.01) |
| *F02D 41/30* | (2006.01) |
| *F02D 41/18* | (2006.01) |

(52) U.S. Cl.
CPC ............... *F01N 9/00* (2013.01); *F01N 9/005* (2013.01); *F01P 3/18* (2013.01); *F01P 7/10* (2013.01); *F01P 7/14* (2013.01); *F01P 11/14* (2013.01); *F02D 41/221* (2013.01); *F02D 41/3005* (2013.01); *F02D 41/40* (2013.01); *F01N 2260/022* (2013.01); *F01N 2260/20* (2013.01); *F01N 2900/1602* (2013.01); *F01P 2031/00* (2013.01); *F02D 41/18* (2013.01); *F02D 2041/0265* (2013.01); *F02D 2041/227* (2013.01); *F02D 2200/0804* (2013.01); *F02D 2200/101* (2013.01); *Y02T 10/44* (2013.01); *Y02T 10/47* (2013.01)

(58) Field of Classification Search
USPC .............................. 60/277, 274, 299; 701/49
See application file for complete search history.

(56) References Cited

U.S. PATENT DOCUMENTS

| | | | |
|---|---|---|---|
| 2008/0256929 A1* | 10/2008 | Sugimoto | ............... F02D 29/02 60/278 |
| 2010/0147611 A1 | 6/2010 | Amano et al. | |
| 2013/0184943 A1 | 7/2013 | Sato et al. | |
| 2014/0005896 A1 | 1/2014 | Hirota et al. | |

FOREIGN PATENT DOCUMENTS

| | | | | |
|---|---|---|---|---|
| JP | H05-58172 A | 3/1993 | | |
| JP | H07324617 A | 12/1995 | | |
| JP | 2007-071126 A | 3/2007 | | |
| JP | 2010111277 A | 5/2010 | | |
| JP | 2010-133259 A | 6/2010 | | |
| JP | WO 2012127292 A1 * | 9/2012 | .......... | B60K 11/085 |
| JP | 2012-197001 A | 10/2012 | | |
| JP | EP 2687394 A1 * | 1/2014 | .......... | B60K 11/085 |
| WO | 01/79671 A1 | 10/2001 | | |
| WO | 2012/029521 A1 | 3/2012 | | |
| WO | 2012/127292 A1 | 9/2012 | | |
| WO | 2012/128122 A1 | 9/2012 | | |

* cited by examiner

LIMP-HOME METHOD FOR
SAFEGUARDING THE CATALYST OF AN
INTERNAL COMBUSTION ENGINE IN CASE
OF A DEFECTIVE CONTROLLED GRILLE
SHUTTER AND VEHICLE THEREOF

CROSS-REFERENCE TO RELATED
APPLICATIONS

This is a national phase application based on the PCT International Patent Application No. PCT/IB2014/000563 filed Apr. 17, 2014, claiming priority to Japanese Patent Application No. 2013-099054 filed May 9, 2013, the entire contents of both of which are incorporated herein by reference.

BACKGROUND OF THE INVENTION

1. Field of the Invention

The present invention relates to a vehicle and a control method thereof, and particularly, to a vehicle including a grille shutter that adjusts an opening area of a radiator grille, and a control method thereof.

2. Description of Related Art

In order to cool off an engine and the like provided in a vehicle, external air is taken into an engine compartment during vehicle running. In order to adjust an amount of the external air to be taken in, a grille shutter is provided in a radiator grille that introduces the external air, and the grille shutter is opened and closed. If the grille shutter is broken and kept closed, a temperature in the engine compartment increases.

For example, Japanese Patent Application Publication No. 2012-197001 (JP 2012-197001 A) describes a grille shutter control, device that performs a driving control on a driving device that opens and closes a grille shutter provided, in an air introduction path that introduces air in front of a vehicle into an engine compartment. Herein, abnormality is detected based on a state after an operation of the grille shutter is started, and a user is informed by a pilot lamp based on the abnormality thus detected.

Japanese Patent Application Publication No. 5-58172 (JP 5-58172 A) suggests that, when an opening and closing operation of movable grilles for a radiator grille and a front cross member is performed between a fully opening state and a fully closing state, a cooling temperature of an engine is changed rapidly, so that engine performance may be decreased. Here, an opening and closing control is performed, according to a load condition of the engine, on two movable grilles, i.e., a first movable grille that takes in external air in front of a vehicle and a second movable grille that takes in external air below or beside the vehicle. It is described that when the engine load condition exceeds a predetermined value in a state where the first movable grille and the second movable grille are opened, an engine load is cut off.

Note that as a technique related to the present invention, Japanese Patent Application Publication No. 2007-71126 (JP 2007-71126 A) describes such a control device of an internal combustion engine that various fuel increase coefficients are added to a map in which a basic injection quantity of fuel is determined based on an air intake amount and an engine speed, according to driving conditions at the time of startup, transient operation, and the like. It is described that one of the fuel increase coefficients is an increase coefficient for restraining a temperature increase in an exhaust system component of the internal combustion engine.

As described in JP 2012-197001 A, when a close malfunction occurs in a grille shutter, a temperature in an engine compartment increases. This increases a temperature of a catalyst provided in an exhaust system of the internal combustion engine, which may cause an overheating state. When the temperature of the catalyst overheats, a catalytic action decreases, so that exhaust-gas purification performance decreases.

SUMMARY OF THE INVENTION

The present invention provides a vehicle and a control method thereof each of which is able to restrain overheating of a catalyst temperature at the time when a grille shutter is broken.

A vehicle according to a first aspect of the present invention includes: an engine; a catalyst purifying exhaust gas of the engine; a grille shutter adjusting an opening area of a radiator grille; and an electronic control unit configured to: (a) control an injection quantity of fuel to be supplied to the engine, (b) detect a malfunction of the grille shutter in a state where the grille shutter is closed, and (c) increase the injection quantity when the malfunction is detected than that when the malfunction is not detected.

In the first aspect, the electronic control unit may calculate an increase coefficient of the injection quantity against a basic injection quantity according to an estimated temperature of the catalyst; the electronic control unit may control a temperature of the catalyst to maintain the estimated temperature of the catalyst within a predetermined range by applying the increase coefficient; and the electronic control unit may control a temperature of the catalyst to decrease when the malfunction is detected than that when the malfunction is not detected.

In the first aspect, the electronic control unit may change a relationship between a threshold temperature to which the increase coefficient is applied and the estimated temperature of the catalyst when the malfunction is detected.

In the first aspect, the electronic control unit may change a value of the increase coefficient when the malfunction is detected.

According to the above configuration, when a close malfunction occurs in the grille shutter, a control to increase the injection quantity in comparison with a case where no close malfunction is detected is performed. This makes it possible to decrease the catalyst temperature more, and to restrain the catalyst temperature from overheating.

A control method of a vehicle according to a second aspect of the present invention is a control method of a vehicle including an engine, a catalyst purifying exhaust gas of the engine, a grille shutter adjusting an opening area of a radiator grille, and an electronic control unit, and the control method includes: controlling, by the electronic control unit, an injection quantity of fuel to be supplied to the engine; detecting, by the electronic control unit, a malfunction of the grille shutter in a state where the grille shutter is closed; and increasing, by the electronic control unit, the injection quantity when the malfunction is detected than that when the malfunction is not detected.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1A, FIG. 1B are sectional views illustrating a configuration of a front part of a vehicle according to an embodiment of the present invention.

DETAILED DESCRIPTION OF EMBODIMENTS

Hereinafter, an embodiment of the present invention is described in detail with reference to the drawings. An arrangement of a shutter grille and an engine in an engine compartment described below is an exemplification for descriptions. Further, maps to be used for control of an internal combustion engine described below are examples for descriptions.

Figures 1A, 1B:
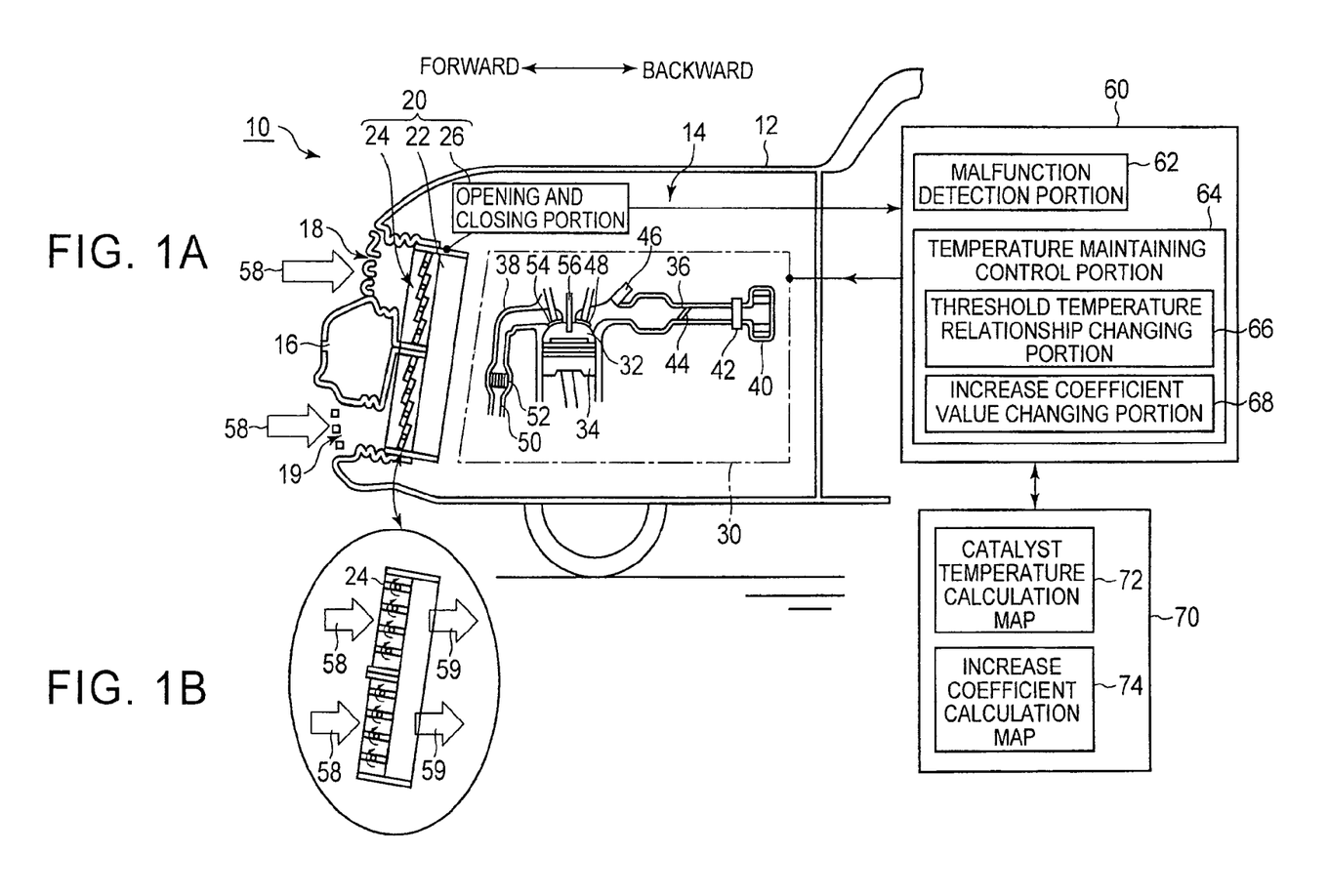
FIG. 1A is a general view.
FIG. 1B is a view illustrating an open state of a grille shutter.

FIGS. 1A, 1B are sectional views of a front part of a vehicle 10 in which an engine 30, which is an internal combustion engine, and a control device (ECU) 60 are provided. FIG. 1A is a view illustrating an entire section of the front part and the control device 60, and FIG. 1B is a view illustrating an open state of a grille shutter 24 to be described later. Note that the grille shutter illustrated in FIG. 1A is in a closed state.

In FIG. 1A, forward and backward directions of the vehicle are indicated. The front part of the vehicle 10 is a part referred to as a bonnet 12, and a place inside the front part is an engine compartment 14 in which to place the engine 30.

A bumper 16 provided in a foremost part of the vehicle 10 is a member for impact absorption. Front grilles 18, 19 provided on an upper side and a lower side so as to sandwich the bumper 16 therebetween are openings that cool off a radiator and the like by taking in, as external air 58 for cooling, travel wind that the vehicle 10 receives during running. The front grilles 18, 19 are called radiator grilles. An inlet of external air for cooling can be also provided on a lower part of the vehicle, in addition to the front grilles 18, 19 provided on the forefront of the vehicle.

An air introducing portion 20 takes in the external air 58 into the engine compartment 14, and adjusts an intake amount thereof. The air introducing portion 20 includes an air introducing path 22, a grille shutter 24 serving as an opening and closing mechanism provided in the air introducing path 22, and an opening and closing portion 26 that performs opening and closing driving on the grille shutter 24.

The air introducing path 22 is a conduit line having a wall portion that sections opening areas of the front grilles 18, 19 inside the engine compartment 14. The external air taken in from the front grilles 18, 19 flows through the conduit line.

The grille shutter 24 is an opening and closing mechanism provided in the air introducing path 22, and serves as an opening and closing shutter that determines whether or not the external air 58 taken in from the front grilles 18, 19 is flowed into the engine compartment 14, and adjusts a flow rate thereof when the external air 58 is flowed. That is, the grille shutter 24 is means for adjusting an opening area of the radiator grilles. The opening and closing of the grille shutter 24 or control of its opening degree is performed by the control device 60 via the opening and closing portion 26 based on a running state of the vehicle 10, a temperature state of the engine compartment 14, and the like.

As the grille shutter 24, any mechanism that can take a fully opening state and a fully closing state is usable. For example, a louver shutter constituted by a plurality of rotary wings that is overlapped with each other in a closed state and is spaced from each other in an open state is usable. Alternatively, a louver shutter in which a direction of a rotating shaft is changed so that opening and closing can be performed by one rotary wing.

FIG. 1A illustrates a state as follows: the rotating wings of the louver shutter as the grille shutter 24 rotate so that their respective surfaces are oriented in a direction generally vertical to a direction where the external air 58 flows. Hereby, the respective surfaces are overlapped with each other, so that the air introducing path 22 is in a fully closed state as a whole. FIG. 1B illustrates a state as follows: the rotating wings constituting the grille shutter 24 rotate so that their respective surfaces are oriented in a direction generally parallel to the direction where the external air 58 flows and spaced from each other to form gaps therebetween. Thus, a fully opening state is achieved and the external air 58 is introduced as air flow 59 into the engine compartment 14 via the air introducing path 22.

The opening and closing portion 26 is an actuator that performs opening and closing driving on the grille shutter 24. As the opening and closing portion 26, it is possible to use an appropriate small-sized motor. For example, a stepping motor that uses a pulse signal as a driving signal and is able to change a turning angle of a rotating shaft in a stepped manner according to the number of pulse signals can be used. A biasing spring may be used for the opening and closing of the grille shutter 24, so that the opening and closing of the grille shutter 24 may be performed to be balanced with its biasing force. In this case, the grille shutter 24 is switched between the fully opening state and the fully closing state according to whether or not there is a driving signal.

Further, the opening and closing portion 26 has a function as a malfunction detection portion which detects whether or not the opening and closing of the grille shutter 24 is performed normally and which outputs a malfunction signal in case of a close malfunction in which the grille shutter 24 is not opened normally although an opening instruction is made. The close malfunction includes: a case where the fully closing state continues although the opening instruction is made; and a case where the grille shutter 24 stops in the middle of opening such that the grille shutter 24 is not opened at an instructed opening degree although the opening instruction is made. The determination on whether or not the close malfunction occurs can be performed by determining whether or not there is a driving signal and whether or not the actuator is operated. The determination on whether or not the actuator is operated can be performed by use of a sensor that detects a rotation of a rotating shaft of the actuator. Alternatively, a flow speed sensor may be provided in the air introducing path 22 so as to detect a flow speed of the air flow 59. Note that, separately from the opening and closing portion 26, a malfunction detection portion may be provided as an independent member.

There may be such a case where an opening and closing state of the grille shutter 24 is normal at first, but is changed to be abnormal for some reason afterward. For example, in a case of a type in which an opening and closing control is performed by use of a biasing spring based on whether or not there is a driving signal, when a driving-signal line is disconnected for some reason, the grille shutter 24 is changed into the closed state despite of an instruction of the open state. Even in a case of a type in which a pulse signal is used as a driving signal, when the driving-signal line is disconnected for some reason, the rotary wings are closed due to a wind pressure of the external air 58. Accordingly, the malfunction detection is performed every detection period set in advance, and a result thereof is transmitted to the control device 60 each time.

The engine 30 is one type of a heat engine that converts a thermal energy into a mechanical energy, and is an internal combustion engine that obtains power by burning fuel in its inside. Here, the engine 30 burns fuel inside a cylinder and rotates a crank shaft connected to a piston by use of a force of a pressure that occurs due to the burning and presses the piston. A gasoline engine that burns a gas mixture obtained by injecting fuel into air is used herein. The engine 30 may be a diesel engine, other than the gasoline engine. In a case of the engine 30 provided in the vehicle 10, it is possible to convert a reciprocating motion in the cylinder of the piston into a rotational motion of the crank shaft, thereby rotating an axle and causing the vehicle 10 to run.

The engine 30 includes a piston 34 that is slidable inside a cylinder 32, an inlet pipe 36 that supplies a gas mixture of air and fuel into the cylinder 32, and an exhaust pipe 38 that exhausts burned gas in the cylinder 32. Note that, in FIG. 1, the exhaust pipe 38 is placed on a front side of the vehicle 10 relative to the inlet pipe 36. However, this is merely an example, and the exhaust pipe 38 may be placed on a rear side of the vehicle 10 relative to the inlet pipe 36 or a direction where the exhaust pipe 38 and the inlet pipe 36 are aligned may be set to a width direction of the vehicle 10.

The inlet pipe 36 includes an air supply opening 40 provided on one end of the inlet pipe 36 and taking in air, a flow meter 42 that detects an amount of the air thus taken in, a throttle valve 44 that adjusts a supply amount of the air, and a fuel injection valve 46 that injects fuel. An inlet valve 48 is disposed in a place connected to the cylinder 32 in the other end of the inlet, pipe 36. The throttle valve 44, the fuel injection valve 46, and the inlet valve 48 are electric-control valves that work according to an electrical signal. An opening and closing amount of the throttle valve 44, an injection quantity from the fuel injection valve 46, an opening and closing timing of the inlet valve 48 are controlled by the control device 60.

The exhaust pipe 38 includes an exhaust opening 50 provided on one end of the exhaust pipe 38 and opened toward the engine compartment 14, and a catalyst 52 provided in the middle of a conduit line so as to purify exhaust gas, which is burned gas. An exhaust valve 54 is disposed in a place connected to the cylinder 32 in the other end of the exhaust pipe 38. The exhaust valve 54 is an electric-control valve that works according to an electrical signal, and an opening and closing timing of the exhaust valve 54 is controlled by the control device 60.

The catalyst 52 used herein oxidizes hydro carbon (HC) and carbon monoxide (CO) included in the burned gas, so as to obtain purified exhaust gas. Further, it is preferable to use a three-way catalyst that purifies exhaust gas by reducing nitrogen oxides (NOx). As the catalyst 52, it is possible to use a catalyst obtained by mixing noble metal Pt, Pd, Rh, and the like, which is a substance that performs oxidation and reduction, with ceramics. An oxidation action and a reduction action of the catalyst 52 depend on a temperature of the catalyst 52. When the temperature becomes an appropriate temperature or more, the oxidation action and the reduction action of the catalyst 52 decrease.

An ignition plug 56 projects into the cylinder 32 and serves as an ignition device that causes explosive combustion of the gas mixture of air and fuel. An ignition timing of the ignition plug 56 is controlled by the control device 60.

The control device 60 has a function to control, as a whole, an operation of the engine 30, etc., while the vehicle 10 is operated. For example, in response to a request of acceleration or deceleration from a user with respect to the vehicle 10, the control device 60 controls operations of the throttle valve 44, the fuel injection valve 46, the inlet valve 48, the exhaust valve 54, and the ignition plug 56. Particularly, the control device 60 has a function to maintain the temperature of the catalyst 52 within a predetermined range by changing the injection quantity of the fuel injection valve 46 from its basic injection quantity so that the temperature of the catalyst 52 does not overheat. The change of the injection quantity from the basic injection quantity is performed by use of an increase coefficient determined in advance, based on an engine speed and an amount of air to be determined by the opening and closing amount of the throttle valve 44.

The control device 60 further controls the opening and closing of the grille shutter 24 via the opening and closing portion 26, and when a close malfunction of the grille shutter 24 is detected, the control device 60 controls to increase the injection quantity in comparison with a case where no close malfunction is detected. Hereby, when a close malfunction of the grille shutter 24 is detected, the temperature of the catalyst 52 is decreased in comparison with a case where no malfunction is detected, so as to prevent the temperature of the catalyst 52 from overheating. In view of this, the control device 60 includes a malfunction detection portion 62 that detects a close malfunction of the grille shutter 24, and a temperature maintaining control portion 64 that maintains the temperature of the catalyst 52 within a predetermined range. The temperature maintaining control portion 64 includes: a threshold temperature relationship changing portion 66 that changes a threshold temperature or an estimated temperature of the catalyst 52, to which the increase coefficient is applied, so that the increase coefficient is easy to be applied thereto; and an increase coefficient value changing portion 68 that changes a value of the increase coefficient.

Such a function is implemented by the control device 60 executing software. More specifically, the function is implemented when the control device 60 executes a catalyst temperature maintaining program. Such a functional may be partially performed by hardware.

A memory device 70 connected to the control device 60 is a memory having a function to store software executed by the control device 60, and the like function. Particularly, the memory device 70 stores therein: a catalyst temperature calculation map 72 obtained such that a relationship among the engine speed, the amount of air, and a catalyst temperature is found in advance and mapped; and an increase coefficient calculation map 74 obtained such that a relationship among the engine speed, the amount of air, and the increase coefficient is found in advance and mapped.

Figure 2:
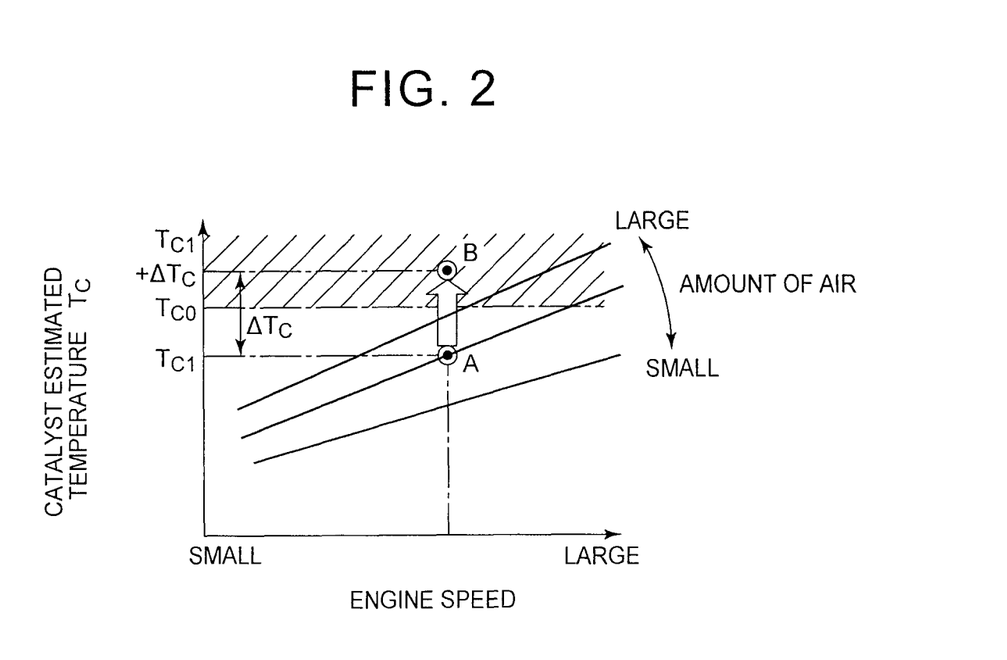
FIG. 2 is a view illustrating one example of a catalyst temperature calculation map used for the vehicle according to the embodiment of the present invention.

FIG. 2 is a view illustrating an example of the catalyst temperature calculation map 72. In FIG. 2, a horizontal axis indicates the engine speed, a vertical axis indicates an estimated temperature $T_C$ of the catalyst 52, and the amount of air is taken as a parameter. As illustrated in FIG. 2, as a value of the engine speed is larger and a value of the amount of air is larger, a temperature of the engine 30 and a temperature of burned gas passing through the exhaust pipe 38 increase, which results in that the estimated temperature $T_C$ of the catalyst 52 increases. In the following description, the estimated temperature $T_C$ of the catalyst 52 is just referred to as a catalyst estimated temperature $T_C$.

In FIG. 2, a temperature shown as the catalyst estimated temperature $T_C=T_{C0}$ is a threshold temperature at which a control to decrease the temperature of the burned gas flowing through the exhaust pipe 38 is started by increasing the increase coefficient to more than 1.0. This is because if the temperature becomes higher than this, purification performance of the catalyst 52 decreases. In FIG. 2, a region where a control to increase the increase coefficient to more than 1.0 is shown by oblique lines. As such, since the increase coefficient is used, for example, to prevent overheating of the catalyst 52, it can be referred to as a catalyst over-temperature (OT) increase coefficient, but is just shown as the increase coefficient herein. The threshold temperature $T_{C0}$ varies depending on a composition and the like of the catalyst 52 and a structure and the like of the engine 30, and one example thereof may be about 900° C.

Figure 3:
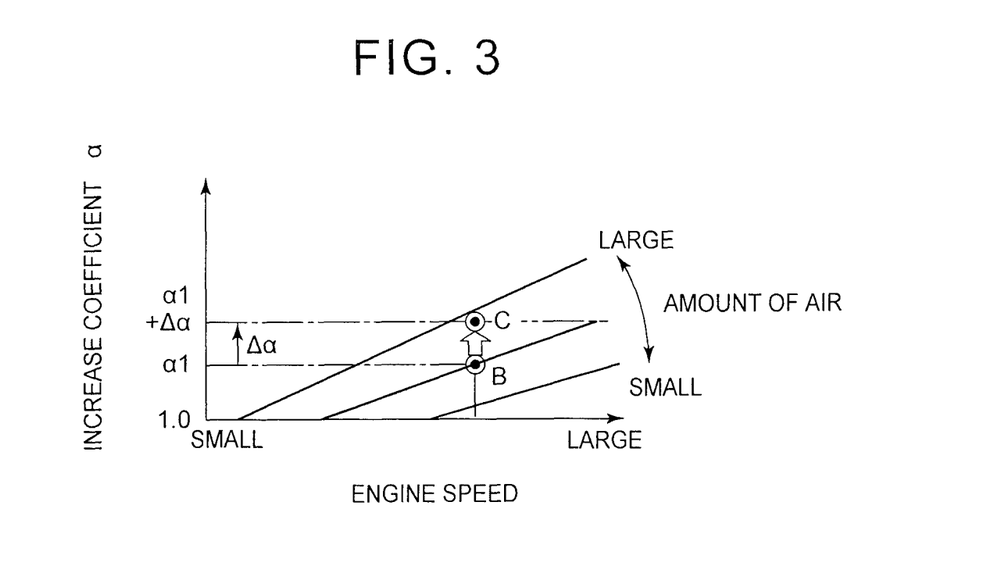
FIG. 3 is a view illustrating one example of an increase coefficient calculation map used for the vehicle according to the embodiment of the present invention.

FIG. 3 is a view illustrating an example of the increase coefficient calculation map 74. In FIG. 3, a horizontal axis indicates the engine speed, a vertical axis indicates an increase coefficient α, and the amount of air is taken as a parameter. The increase coefficient α–1.0 indicates a state where the injection quantity is the basic injection quantity. As a value of the engine speed is larger and a value of the amount of air is larger, the catalyst estimated temperature $T_C$ becomes high as described in FIG. 2, so that the increase coefficient α takes a higher value as illustrated in FIG. 3.

In the above description, the relationship among the engine speed, the amount of air, and the catalyst estimated temperature $T_C$, and the relationship among the engine speed, the amount of air, and the increase coefficient α are stored in a form of a map. These relationships may be stored in a form other than the map. For example, these relationships can be stored in a form of a look-up table, so that when the engine speed and the amount of air are given, the catalyst estimated temperature $T_C$ or the increase coefficient α can be read. Further, these relationships may be stored in a form of a relational expression, so that when the engine speed and the amount of air are input, the catalyst estimated temperature $T_C$ or the increase coefficient α is output. Alternatively, these relationships may be stored in an ROM form, so that when the engine speed and the amount of air are input, the catalyst estimated temperature $T_C$ or the increase coefficient α is output.

Figure 4:
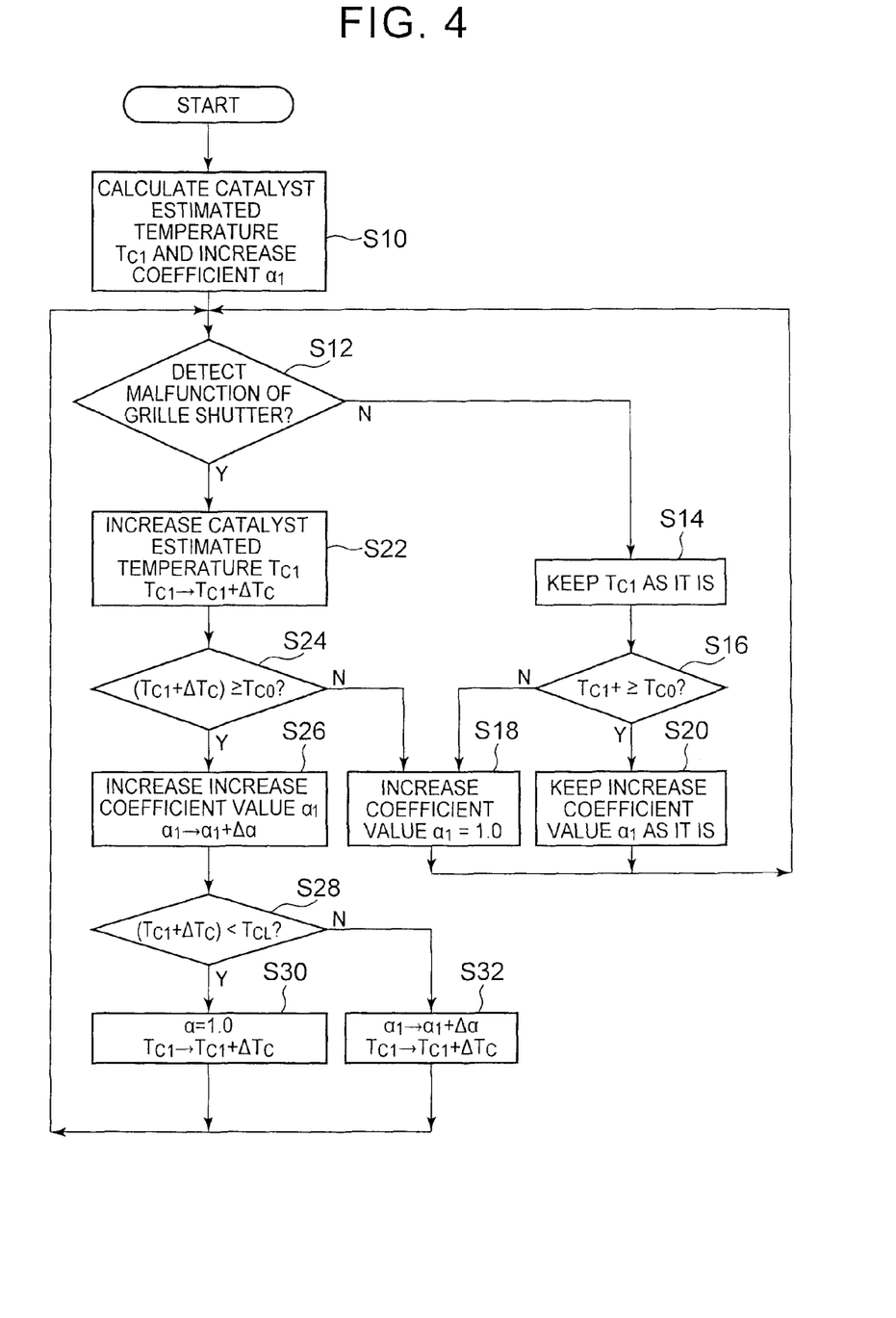
FIG. 4 is a flow chart illustrating a procedure of an injection quantity control method of an internal combustion engine according to the embodiment of the present invention.

An action of the above configuration, particularly, each function of the control device 60 is described in more detail with reference to FIG. 4, and FIGS. 2 and 3 if necessary. FIG. 4 is a flow chart illustrating a control method of an internal combustion engine, particularly, illustrating a procedure of a method for maintaining the catalyst temperature. Each step corresponds to each process of the catalyst temperature maintaining program.

In FIG. 4, when the catalyst temperature maintaining program is started, calculation of a catalyst estimated temperature $T_{C1}$ and an increase coefficient $α_1$ corresponding to a current engine speed and an amount of air is performed (S10). The current engine speed is obtained by rotation detecting means for detecting the number of rotations of the crank shank of the engine 30. The amount of air is obtained by throttle-valve opening and closing degree detecting means for detecting an opening and closing degree of the throttle valve 44. Based on the engine speed and the amount of air thus obtained, the catalyst temperature calculation map 72 and the increase coefficient calculation map 74 stored in the memory device 70 are read out and referred to, so that the calculation of the current catalyst estimated temperature $T_{C1}$ and the increase coefficient α1 is performed.

Then, it is determined whether or not a close malfunction of the grille shutter 24 is detected (S12). This process is performed by a function of the malfunction detection portion 62 of the control device 60. In a case of No in S12, the opening and closing state of the grille shutter 24 is normal, so that the process shifts to steps of S14 to S20. The steps of S14 to S20 are steps of a normal temperature maintaining control to maintain the temperature of the catalyst 52 within a predetermined range, and are performed by a function of the temperature maintaining control portion 64 of the control device 60.

The normal temperature maintaining control is performed as follows. That is, with the use of the catalyst estimated temperature $T_{C1}$ calculated in S10 as it is (S14), it is determined whether or not the current catalyst estimated temperature $T_{C1}$ is the threshold temperature $T_{C0}$ or more (S16). In a case of No in the determination of S16, the current catalyst estimated temperature $T_{C1}$ is less than the threshold temperature $T_{C0}$, so that it is determined that the increase coefficient α1=1, so that the injection quantity is maintained to be the basic injection quantity. In a case of Yes in S16, the current catalyst estimated temperature $T_{C1}$ is the threshold temperature $T_{C0}$ or more and is included in the region shown by oblique lines in FIG. 2, and the increase coefficient α1 is calculated to be 1.0 or more. The increase coefficient α1 thus calculated is used as it is, and the injection quantity is increased in response to the increase coefficient α1 thus calculated. Hereby, an ambient temperature around the catalyst 52 decreases, thereby resulting in that the temperature of the catalyst 52 is maintained within the predetermined range.

In a case of Yes in the determination of S12, the opening and closing state of the grille shutter 24 is abnormal, which is a close-malfunction state. At that time, the engine compartment 14 is not cooled off sufficiently, so that its temperature increases and the catalyst 52 overheats. In view of this, in the case of Yes in S12, at least one of the current catalyst estimated temperature $T_{C1}$ and the current increase coefficient α1 which are maintained "just as they are" in S14 to S20 of the normal temperature maintaining control is changed. The change is performed so as to be able to perform a control to decrease the temperature of the catalyst 52 more by increasing the injection quantity more, in comparison with a case where no malfunction of the grille shutter 24 is detected, that is, in comparison with the normal temperature maintaining control.

That is, in the case of Yes in the determination of S12, the current catalyst estimated temperature $T_{C1}$ is increased by an amount $ΔT_C$ that is determined in advance, so as to be changed into $(T_{C1}+ΔT_C)$ (S22). This process is performed by a function of the threshold temperature relationship changing portion 66 of the control device 60. Then, it is determined whether or not the temperature $(T_{C1}+ΔT_C)$ thus increased is the threshold temperature $T_{C0}$ or more (S24). In a case of No in the determination, it is determined that there is little possibility that the catalyst 52 overheats. Accordingly, it is determined that the increase coefficient α1=1.0, so that the injection quantity is maintained to be the basic injection quantity (S18). In a case of Yes in the determination, processes of S26 and its subsequent steps are performed.

FIG. 2 illustrates a state of the process of S22. Here, a state of the current catalyst estimated temperature $T_{C1}$ is shown by a circled point A. Here, the state of the point A is less than the threshold temperature $T_{C0}$. A state obtained by increasing the catalyst estimated temperature just by $\Delta T_C$ in the process of S22 from the state of the point A is shown as a circled point B. In the state of the point B, the catalyst estimated temperature is included in the region where the catalyst estimated temperature is more than the threshold temperature $T_{C0}$ and the increase coefficient $\alpha$ of 1.0 or more is applied.

As such, the process of S22 is performed to facilitate the application of the increase coefficient $\alpha$ of 1.0 or more when the malfunction detection portion 62 detects a close malfunction of the grille shutter 24. That is, by the process of S22, it is determined to Yes in S24 more frequently, so that the temperature maintaining control of the catalyst 52 is performed more frequently. Hereby, in comparison with the normal temperature maintaining control, the injection quantity is increased and it is possible to perform a control to decrease the temperature of the catalyst 52 more.

In the above description, the current catalyst estimated temperature $T_{C1}$ is increased just by the amount $\Delta T_C$ that is determined in advance, so that the temperature maintaining control of the catalyst 52 is performed more frequently. However, the threshold temperature $T_{C0}$ may be decreased only by the amount $\Delta T_C$ that is determined in advance. In this case, the region shown by oblique lines in FIG. 2 is expanded to a lower temperature side. As such, it is possible to perform the process of S22 by changing at least either one of the current catalyst estimated temperature $T_{C1}$ and the threshold temperature $T_{C0}$), so as to change the threshold temperature relationship.

In a case of Yes in the determination of S24 in FIG. 4, the catalyst estimated temperature is included in the region where the increase coefficient $\alpha$ of 1.0 or more is applied, as illustrated in FIG. 2. In view of this, with the use of FIG. 3, the increase coefficient for the point B is replaced with $\alpha_1$, and a value thereof can be applied. In this case, as described above, such an effect of the process of S22 is obtained that the temperature maintaining control of the catalyst 52 is performed frequently, so that the injection quantity increases and the temperature of the catalyst 52 is decreased more.

In S26, a process of decreasing the temperature of the catalyst 52 further more is performed, in the case of Yes in the determination of S24. That is, a value $\alpha_1$ of the increase coefficient for the catalyst estimated temperature $(T_{C1}+\Delta T_C)$ increased in S22 is increased only by an amount $\Delta\alpha$ that is determined in advance, so as to be $(\alpha_1+\Delta\alpha)$ (S26). This state is shown in FIG. 3. As such, when the malfunction detection portion 62 detects a close malfunction of the grille shutter 24, the increase coefficient $\alpha_1$ is changed to a larger value. Accordingly, in comparison with the normal temperature maintaining control, it is possible to directly increase the injection quantity and to perform a control to decrease the temperature of the catalyst 52 more. In this case, in combination with the effect of S22, it is possible to decrease the temperature of the catalyst 52 further more. The value of $\Delta\alpha$ varies depending on a composition of the catalyst 52, a structure of the engine 30, a specification of the vehicle 10, and so on, but one example thereof may be $\Delta\alpha$=about 0.1.

As such, when the temperature of the catalyst 52 decreases by the effects of S22 and S26, it is subsequently determined whether or not the catalyst estimated temperature $(T_{C1}+\Delta_C)$ increased in S22 becomes a second threshold temperature $T_{CL}$ determined in advance, or less (S28). The second threshold temperature $T_{CL}$ is a temperature decreased by a temperature determined in advance from the threshold temperature $T_{C0}$ described in FIG. 2. For example, the threshold temperature $T_{C0}$ is about 900° C. and the second threshold temperature $T_{CL}$ is about 850° C.

In a case of No in the determination of S28, the increase coefficient is maintained to be $(\alpha_1+\Delta\alpha)$, and the catalyst estimated temperature is also maintained to be $(T_{C1}+\Delta T_C)$ (S32). Then, the process returns to S12 and the above steps are further repeated. In a case of Yes in the determination of S28, the catalyst estimated temperature is maintained to be $(T_{C1}+\Delta T_C)$ and the increase coefficient $\alpha_1$ is set to 1.0 (S30). Here, the process returns to S12, and the above steps are repeated. That is, since the grille shutter 24 is in a malfunction state, the injection quantity is returned to the basic injection quantity. However, the catalyst estimated temperature is increased, and the temperature maintaining control of the catalyst 52 is performed more frequently, so that when the temperature of the catalyst 52 increases, its temperature is easy to decrease.

As such, when the grille shutter 24 is broken, a control to decrease the catalyst estimated temperature $T_{C1}$ more is performed in the control to maintain the estimated temperature of the catalyst 52, thereby making it possible to restrain the temperature of the catalyst 52 from overheating.

What is claimed is:

1. A vehicle comprising:
    an engine;
    a catalyst purifying exhaust gas of the engine;
    a grille shutter adjusting an opening area of a radiator grille; and
    an electronic control unit configured to:
        (a) control an injection quantity of fuel to be supplied to the engine,
        (b) detect a malfunction of the grille shutter in a state where the grille shutter is closed, and
        (c) increase the injection quantity when the malfunction is detected than that when the malfunction is not detected.

2. The vehicle according to claim 1, wherein
    the electronic control unit calculates an increase coefficient of the injection quantity against a basic injection quantity according to an estimated temperature of the catalyst;
    the electronic control unit controls a temperature of the catalyst to maintain the estimated temperature of the catalyst within a predetermined range by applying the increase coefficient; and
    the electronic control unit controls a temperature of the catalyst to decrease when the malfunction is detected than that when the malfunction is not detected.

3. The vehicle according to claim 2, wherein
    the electronic control unit changes a relationship between a threshold temperature to which the increase coefficient is applied and the estimated temperature of the catalyst when the malfunction is detected.

4. The vehicle according to claim 2, wherein:
    the electronic control unit changes a value of the increase coefficient when the malfunction is detected.

5. A control method of a vehicle including an engine, a catalyst purifying exhaust gas of the engine, a grille shutter adjusting an opening area of a radiator grille, and an electronic control unit, the control method comprising:

controlling, by the electronic control unit, a fuel injection valve to control an injection quantity of fuel to be supplied to the engine;
detecting, by the electronic control unit, a malfunction of the grille shutter in a state where the grille shutter is closed; and
controlling, by the electronic control unit, the fuel injection valve to increase the injection quantity when the malfunction is detected than that when the malfunction is not detected.

* * * * *